(12) United States Patent
Lumbab et al.

(10) Patent No.: US 10,294,867 B2
(45) Date of Patent: May 21, 2019

(54) METHODS AND APPARATUS FOR NOISE ATTENUATION IN AN ENGINE NACELLE

(71) Applicant: The Boeing Company, Seal Beach, CA (US)

(72) Inventors: Alex C. Lumbab, Bothell, WA (US); Bradley Scott Leisten, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 120 days.

(21) Appl. No.: 15/453,400

(22) Filed: Mar. 8, 2017

(65) Prior Publication Data

US 2017/0175642 A1 Jun. 22, 2017

Related U.S. Application Data

(63) Continuation of application No. 14/266,071, filed on Apr. 30, 2014, now Pat. No. 9,604,438.

(51) Int. Cl.
| | |
|---|---|
| *F02C 7/24* | (2006.01) |
| *F01D 25/24* | (2006.01) |
| *G10K 11/16* | (2006.01) |
| *B32B 37/14* | (2006.01) |
| *B32B 37/12* | (2006.01) |
| *F02C 7/045* | (2006.01) |
| *B32B 38/18* | (2006.01) |

(52) U.S. Cl.
CPC ................ *F02C 7/24* (2013.01); *B32B 37/12* (2013.01); *B32B 37/146* (2013.01); *F01D 25/24* (2013.01); *F02C 7/045* (2013.01); *G10K 11/161* (2013.01); *B32B 38/1833* (2013.01); *B32B 2250/03* (2013.01); *B32B 2307/102* (2013.01); *B32B 2597/00* (2013.01); *B32B 2605/18* (2013.01); *F05D 2220/36* (2013.01); *F05D 2230/60* (2013.01); *F05D 2250/283* (2013.01); *F05D 2260/96* (2013.01); *Y10T 156/10* (2015.01)

(58) Field of Classification Search
CPC ......... F02C 7/24; F02C 7/045; G10K 11/161; F01D 25/24; F05D 2230/60; F05D 2260/96; F05D 2220/36; F05D 2250/283; B32B 37/146; B32B 37/12; B32B 2307/102; B32B 2605/18; B32B 38/1833; B32B 2597/00; B32B 2250/03; Y10T 156/10
USPC ............... 415/119; 244/1 N; 29/897, 897.15, 29/897.32
See application file for complete search history.

(56) References Cited

U.S. PATENT DOCUMENTS

| | | | |
|---|---|---|---|
| 3,806,928 | A | 4/1974 | Costanza |
| 4,539,244 | A | 9/1985 | Beggs et al. |
| 4,738,416 | A | 4/1988 | Birbragher |
| 5,041,323 | A | 8/1991 | Rose et al. |

(Continued)

FOREIGN PATENT DOCUMENTS

| | | |
|---|---|---|
| EP | 0911803 A2 | 4/1999 |
| EP | 2241504 A2 | 10/2010 |

(Continued)

*Primary Examiner* — Hoang M Nguyen
(74) *Attorney, Agent, or Firm* — Armstrong Teasdale LLP (57) ABSTRACT

An inner barrel for a nacelle for an engine is provided. The inner barrel includes a radially inner acoustic liner and a radially outer structural barrel. The structural barrel includes a flange for coupling the inner barrel to the nacelle. At least a portion of the flange is formed integrally with the structural barrel.

19 Claims, 5 Drawing Sheets

(56) References Cited

U.S. PATENT DOCUMENTS

| | | | |
|---|---|---|---|
| 5,156,362 A | 10/1992 | Leon | |
| 5,344,280 A * | 9/1994 | Langenbrunner | F01D 21/045 415/119 |
| 5,653,836 A | 8/1997 | Mnich et al. | |
| 6,203,656 B1 * | 3/2001 | Syed | B29C 65/5057 156/292 |
| 6,268,038 B1 | 7/2001 | Porte et al. | |
| 6,371,242 B1 | 4/2002 | Wilson et al. | |
| 6,536,556 B2 | 3/2003 | Porte | |
| 6,607,625 B2 | 8/2003 | Andre et al. | |
| 6,615,950 B2 | 9/2003 | Porte et al. | |
| 6,688,558 B2 | 2/2004 | Breer et al. | |
| 6,749,704 B2 | 6/2004 | Boussu et al. | |
| 6,755,280 B2 | 6/2004 | Porte et al. | |
| 6,761,245 B2 | 7/2004 | Porte | |
| 6,772,857 B2 | 8/2004 | Porte et al. | |
| 6,820,337 B2 | 11/2004 | Buge et al. | |
| 6,840,349 B2 | 1/2005 | Andre et al. | |
| 6,896,099 B2 | 5/2005 | Porte et al. | |
| 6,923,931 B2 | 8/2005 | Dublineau et al. | |
| 7,257,894 B2 | 8/2007 | Buge et al. | |
| 7,338,696 B2 | 3/2008 | Rambaud et al. | |
| 7,484,592 B2 | 2/2009 | Porte et al. | |
| 7,503,425 B2 | 3/2009 | Strunk | |
| 7,780,117 B2 | 8/2010 | Botura et al. | |
| 7,790,082 B2 | 9/2010 | Buge et al. | |
| 7,857,093 B2 | 12/2010 | Sternberger et al. | |
| 7,921,966 B2 | 4/2011 | Chiou et al. | |
| 7,923,668 B2 | 4/2011 | Layland et al. | |
| 8,067,097 B2 | 11/2011 | Mueller | |
| 8,181,900 B2 | 5/2012 | Chene et al. | |
| 8,240,982 B2 | 8/2012 | Vauchel | |
| 8,740,137 B2 | 6/2014 | Vauchel et al. | |
| 8,863,893 B2 | 10/2014 | Sternberger et al. | |
| 8,899,512 B2 | 12/2014 | Vauchel et al. | |
| 8,919,494 B2 | 12/2014 | Burkett et al. | |
| 9,027,884 B2 | 5/2015 | Valleroy et al. | |
| 9,604,438 B2 * | 3/2017 | Lumbab | B32B 37/12 |
| 2002/0157764 A1 | 10/2002 | Andre et al. | |
| 2003/0021976 A1 | 1/2003 | Dublineau et al. | |
| 2003/0042657 A1 | 3/2003 | Dublineau et al. | |
| 2004/0023026 A1 | 2/2004 | Rambaud et al. | |
| 2004/0065775 A1 | 4/2004 | Buge et al. | |
| 2004/0148891 A1 | 8/2004 | Porte et al. | |
| 2004/0227276 A1 | 11/2004 | Buge et al. | |
| 2004/0237502 A1 | 12/2004 | Moe et al. | |
| 2005/0006529 A1 | 1/2005 | Moe et al. | |
| 2005/0081992 A1 | 4/2005 | Buge et al. | |
| 2005/0082112 A1 | 4/2005 | Harrison | |
| 2005/0254955 A1 | 11/2005 | Helder et al. | |
| 2006/0145001 A1 | 7/2006 | Smith | |
| 2006/0219475 A1 | 10/2006 | Olsen et al. | |
| 2007/0210073 A1 | 9/2007 | Hubert et al. | |
| 2008/0179448 A1 | 7/2008 | Layland et al. | |
| 2008/0248278 A1 | 10/2008 | Fisher et al. | |
| 2009/0140104 A1 | 6/2009 | Surply et al. | |
| 2010/0084507 A1 | 4/2010 | Vauchel et al. | |
| 2010/0176250 A1 | 7/2010 | Porte | |
| 2010/0199629 A1 | 8/2010 | Chene et al. | |
| 2010/0252689 A1 | 10/2010 | Vauchel et al. | |
| 2010/0260602 A1 * | 10/2010 | Binks | B64D 29/08 415/214.1 |
| 2011/0142615 A1 * | 6/2011 | Riou | B64D 33/02 415/220 |
| 2011/0147534 A1 | 6/2011 | Chelin et al. | |
| 2011/0162429 A1 | 7/2011 | Leacock et al. | |
| 2011/0248117 A1 | 10/2011 | Boock et al. | |
| 2013/0126265 A1 | 5/2013 | Sternberger et al. | |
| 2013/0283821 A1 | 10/2013 | Gilson et al. | |
| 2015/0129045 A1 | 5/2015 | Kane et al. | |

FOREIGN PATENT DOCUMENTS

| | | |
|---|---|---|
| GB | 1490923 A | 11/1977 |
| GB | 2273131 A | 6/1994 |
| WO | 2012116999 A1 | 9/2012 |
| WO | 2014170609 A1 | 10/2014 |

\* cited by examiner

METHODS AND APPARATUS FOR NOISE ATTENUATION IN AN ENGINE NACELLE

CROSS-REFERENCE TO RELATED APPLICATIONS

This application is a continuation and claims priority to U.S. patent application Ser. No. 14/266,071 filed Apr. 30, 2014 for "METHODS AND APPARATUS FOR NOISE ATTENUATION IN AN ENGINE NACELLE", which is hereby incorporated by reference in its entirety.

BACKGROUND

The field of the disclosure relates generally to noise attenuation, and, more particularly, to methods and apparatus for attenuating noise in an engine nacelle.

At least some known engines, such as some known jet engines and turbofan jet engines, are surrounded by a generally barrel-shaped nacelle. At least some known nacelles include an inner barrel in which an acoustic core material provides both structural strength and noise attenuation for the nacelle. For one example, at least one known acoustic core material includes a honeycomb core, a perforated facesheet coupled to an inboard side of the core, and a backsheet coupled to an outboard side of the core. Sound waves generated inside the engine enter the cells of the core through the facesheet and reflect from the backsheet at a phase different from the entering sound waves, which tends to cancel out the incoming sound waves.

Moreover, at least some known acoustic core materials include an approximately linear material, that is, a material that responds substantially the same to acoustic waves regardless of the sound pressure (i.e., amplitude) of the waves, to facilitate noise attenuation. For example, in at least some known acoustic core materials, the facesheet and/or another layer is uniformly covered with perforations that each have a diameter on the order of a few hundredths of an inch. Typically, the perforations are arranged such that the facesheet or other approximately linear layer has a porosity of from 3 to 10 percent open area. The linearity of the facesheet increases with the density of such perforations. However, the linearity, and thus the acoustic performance, of at least some known facesheets is limited because a cost and a time required to form more of the small perforations with a necessary precision is prohibitive.

At least some known acoustic core materials include an additional linear layer to facilitate attenuation of a broader spectrum of noise. For example, at least some known core materials include a septum positioned at a partial depth within the honeycomb cells. However, to satisfy the structural strength requirements of the engine, at least some known acoustic core materials for nacelles include core cells that are "full depth," that is, the cell walls are continuous through the core from a first surface, adjacent to the facesheet, to an opposing second surface, adjacent to the backsheet. Thus, to form a septumized core, a segment of septum material must be inserted, positioned, and secured individually within each full depth cell, which significantly increases a cost and time required to manufacture the septumized honeycomb material.

Furthermore, in at least some known acoustic core materials, the backsheet does not substantially contribute to the strength of the acoustic core material. Rather, the strength of the acoustic core material is based on the strength of the core and, additionally or alternatively, the facesheet.

BRIEF DESCRIPTION

In one aspect, an inner barrel for a nacelle for an engine is provided. The inner barrel includes a radially inner acoustic liner and a radially outer structural barrel. The structural barrel includes a flange for coupling the inner barrel to the nacelle. At least a portion of the flange is formed integrally with the structural barrel.

In another aspect, a method of making a nacelle is provided. The method includes disposing a fabric sheet generally concentrically around a first core. The first core includes a plurality of first core cells defined by a corresponding plurality of first core cell walls. The first core has a first core thickness. The method also includes disposing a second core generally concentrically about the fabric sheet. The second core includes a plurality of second core cells defined by a corresponding plurality of second core cell walls. The second core has a second core thickness. The method further includes coupling the fabric sheet between the first core and the second core, and coupling the second core to a radially outer structural barrel. The structural barrel includes a flange, and at least a portion of the flange is formed integrally with the structural barrel. Additionally, the method includes coupling the flange of the structural barrel to a turbofan casing.

DETAILED DESCRIPTION

The apparatus and methods described herein provide for a lightweight and efficient engine nacelle that attenuates noise promulgating from the engine while also providing increased structural rigidity. The engine nacelle includes a lipskin assembly comprising a lipskin that includes a first segment and a second segment that are coupled together at a location proximate to a hilite of the nacelle. The second segment extends sufficiently far downstream to reduce or eliminate a need for at least one closeout panel aft of the lipskin. In addition to separately formed first and second segments, the embodiments provide for superplastic, or alternatively non-superplastic, stretch-forming of the first and second segments to facilitate reducing or eliminating ripples and/or waves in the lipskin. As such, the lipskin described herein unexpectedly reduces or eliminates a premature transition from natural laminar air flow to turbulent air flow as compared to conventional lipskins.

Moreover, the lipskin assembly may include a linear facesheet coupled between an acoustic core and the lipskin.

Each of the acoustic core, linear facesheet, and lipskin include a plurality of openings that facilitate channeling heated air therethrough to provide ice prevention measures on the nacelle. The openings in the linear facesheet form a plurality of tortuous paths that facilitate damping the noise generated by the engine within the nacelle. As such, the lipskin itself may not be relied upon to perform noise attenuation, which may allow for openings in the lipskin to be fewer in number and larger than those in other conventional lipskin. More specifically, the lipskin openings can be elongated in a direction of airflow to facilitate an increased percent open area of the lipskin while maintaining structural integrity of the lipskin and reducing excrescence drag. As such, the lipskin assembly facilitates an ease of manufacture of the nacelle by avoiding a time- and cost-intensive lipskin opening formation process.

Furthermore, the engine nacelle may provide for additional noise attenuation using a plurality of generally concentric cores. A thickness of a first of the plurality of cores is not equal to a thickness of a second of the plurality of cores, such that the second core complements a damping provided by first core. Because the first and second cores may not be relied upon to meet structural strength requirements of the nacelle, the cells in the first core generally may not be aligned with the cells in a second core, facilitating an ease of manufacture of the nacelle by avoiding a time- and cost-intensive cell alignment and/or cell-by-cell septumization process. In addition, the apparatus and methods described herein provide a core linear facesheet that is similar to the lipskin described above in that the core linear facesheet includes elongated orifices that facilitate an increased percent open area of the facesheet while maintaining structural integrity of the facesheet and reducing excrescence drag.

The structural rigidity of the nacelle may be provided by a forward bulkheads and an aft bulkhead. Each of the forward and aft bulkheads include a curvilinear body portion that extends from the second segment of the lipskin to one of the first segment of the lipskin or the plurality of cores. The body portions are curved in cross section such that they are able to receive an impact load, from a birdstrike, for example, and transfer that load circumferentially about the circumference of the nacelle. Furthermore, the curvilinear body portion of the aft bulkhead is configured to react to radial loads caused by a fan blade out event. As such, the exemplary engine nacelle eliminates the need for an additional crush zone component to react to the radial load. Moreover, the forward bulkhead is formed from a thermal insulating material such that independent insulating components are not required in the exemplary nacelle. Accordingly, the forward and aft bulkheads facilitate reducing the part count of the engine nacelle and provide for a lighter, less expensive, and more easily serviceable engine nacelle.

Used in combination, the features described above provide for a noise attenuating engine nacelle that is easier to manufacture, more fuel efficient, less expensive, more easily serviceable, and more lightweight than conventional engine nacelles. However, while a preferred implementation of the engine nacelle includes each of the features described above, it is contemplated that any one of such features provides for an improved engine nacelle as compared to known nacelles. As such, the exemplary engine nacelle described herein may have one, all, or any combination of the features described above.

Figure 1:
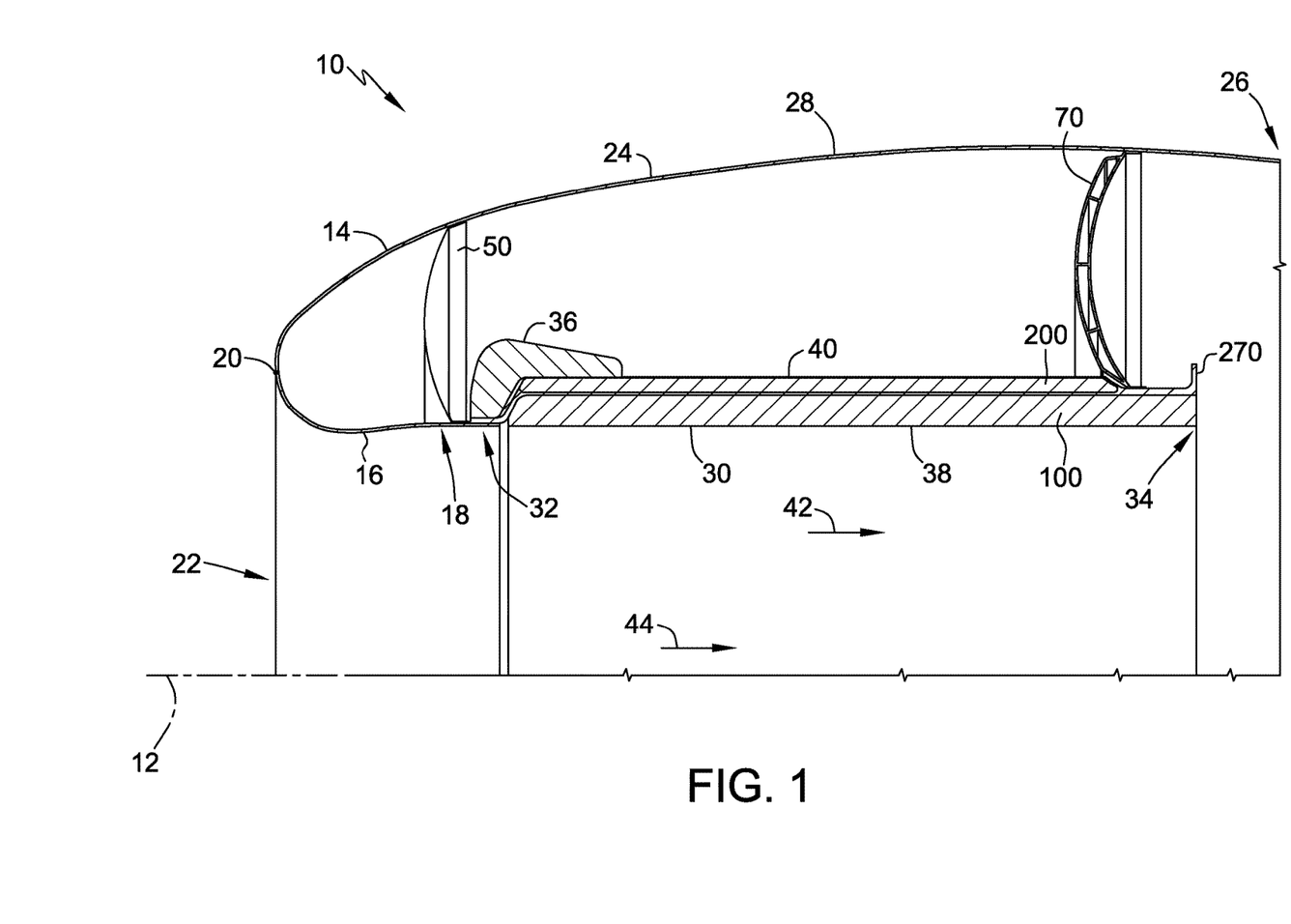
FIG. 1 is a schematic diagram of an embodiment of an engine nacelle.

Referring more particularly to the drawings, implementations of the disclosure may be described in the context of a nacelle 10 shown schematically in cross-section in FIG. 1.

In an embodiment, nacelle 10 encloses a turbofan engine for use with an aircraft. It should be understood, however, that the disclosure applies equally to nacelles for other types of engines, as well as to other structures subjected to noise-generating fluid flow in other applications, including but not limited to automobiles, heavy work vehicles, and other vehicles.

In the illustrated embodiment, nacelle 10 extends generally circumferentially about a centerline 12. A lipskin assembly 14 includes a first lipskin segment 16 that extends from a first lipskin edge 18 to a hilite 20 to define a generally diffuser-shaped inlet 22 of nacelle 10.

Lipskin assembly 14 further includes a second segment 24 that extends from hilite 20 to a second lipskin edge 26 to form at least a portion of a radially outer barrel 28 of nacelle 10. A radially inner barrel 30 extends from a first inner barrel edge 32, proximate to first lipskin edge 18, to a second inner barrel edge 34. Inner barrel 30 includes a radially inner surface 38 and a generally concentric radially outer surface 40. Radially inner surface 38 is disposed proximate to an airflow 42 that enters through inlet 22 and flows generally downstream in an axial direction 44 when nacelle 10 is in an operational state.

In an embodiment, inner barrel 30 includes a radially inner acoustic liner 100 and a radially outer structural inner barrel 200. Structural inner barrel 200 is coupled to lipskin assembly 14 through a plurality of circumferentially spaced gusseted brackets 36. More specifically, gusseted brackets 36 extend from structural inner barrel 200 proximate to first inner barrel edge 32 and are configured to couple to first lipskin edge 18. In alternative embodiments, inner barrel 30 and lipskin assembly 14 are coupled in any suitable fashion that enables nacelle 10 to function as described herein. Structural inner barrel 200 also includes a flange 270 proximate to second inner barrel edge 34. Flange 270 extends generally radially outward and facilitates coupling inner barrel 30 to, for example, a turbofan casing (not shown) of nacelle 10. In the illustrated embodiment, flange 270 is formed integrally with structural inner barrel 200. Thus, flange 270 enables inner barrel 30 to be coupled to nacelle 10 without a need for fasteners to extend through acoustic liner 100. Avoiding fasteners within acoustic liner 100 facilitates preserving an acoustic noise attenuation performance of acoustic liner 100. In alternative embodiments, flange 270 is coupled to structural inner barrel 200 in any suitable fashion.

A generally annular forward bulkhead 50 extends radially between first lipskin segment 16 and second lipskin segment 24. In the illustrated embodiment, forward bulkhead 50 extends from first lipskin segment 16 generally proximate to first lipskin edge 18. In addition, a generally annular aft bulkhead 70 extends radially between inner barrel 30 and second lipskin segment 24. In the illustrated embodiment, aft bulkhead 70 extends from inner barrel 30 generally proximate to second inner barrel edge 34. In alternative embodiments, forward bulkhead 50 and aft bulkhead 70 are disposed in any suitable position that enables nacelle 10 to function as described herein.

Figure 2:
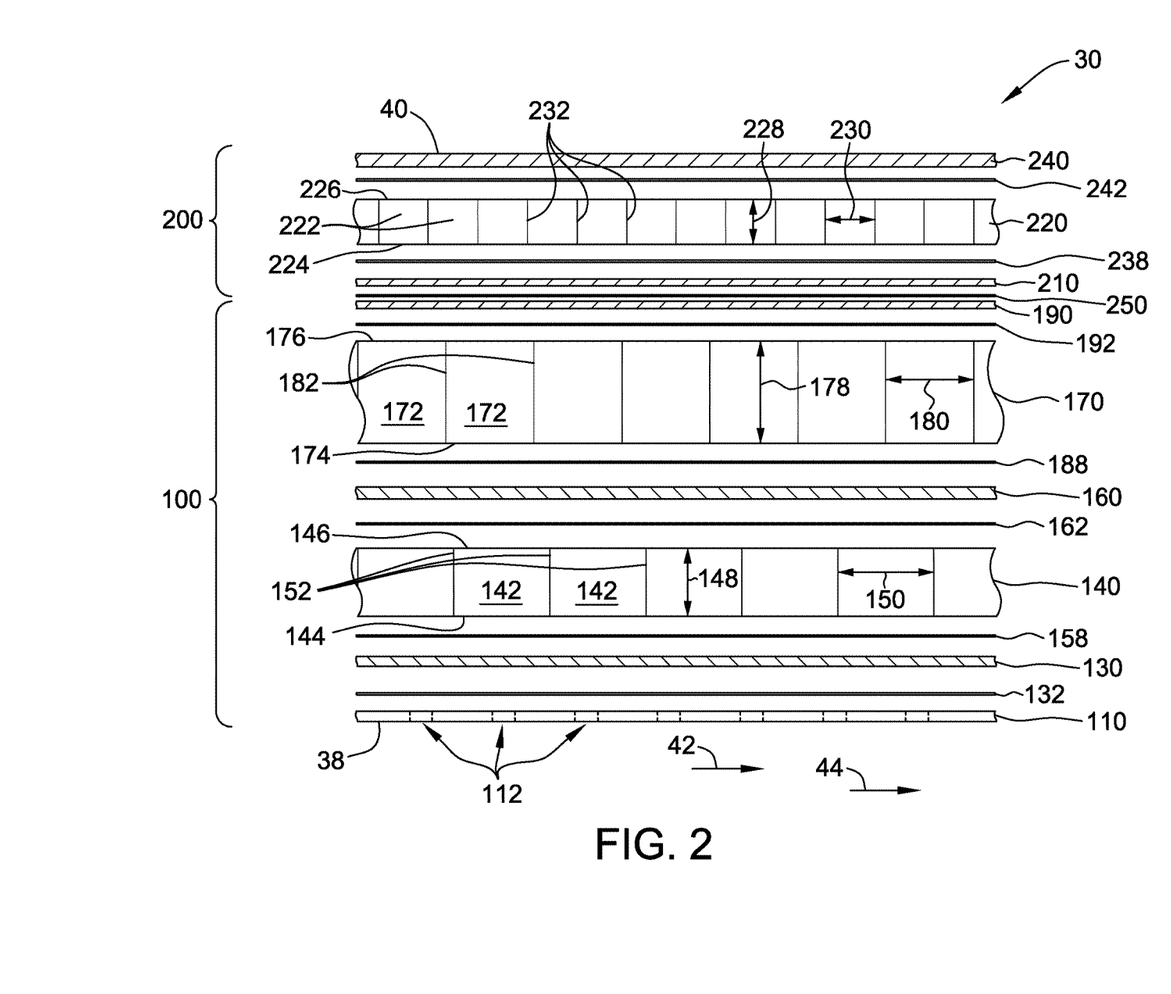
FIG. 2 is a schematic exploded cross-section of an embodiment of an inner barrel that may be used with the engine nacelle shown in FIG. 1.

FIG. 2 is a schematic exploded cross-section of an embodiment of inner barrel 30. In the illustrated embodiment, inner barrel 30 includes an acoustic liner 100 proximate to radially inner surface 38, and a structural inner barrel 200 proximate to radially outer surface 40.

Acoustic liner 100 includes as its radially innermost layer an acoustic liner facesheet 110. Acoustic liner facesheet 110 is in contact with airflow 42 when nacelle 10 is in an operational state. In certain embodiments, acoustic liner facesheet 110 is formed from a carbon fiber-reinforced thermoplastic fabric, with a thickness in a range of about 0.005 to about 0.050 inches. In an embodiment, acoustic liner facesheet 110 has a thickness of about 0.020 inches. In alternative embodiments, acoustic liner facesheet 110 is formed from any suitable material and has any suitable thickness that enables acoustic liner facesheet 110 to function as described herein.

Figure 3:
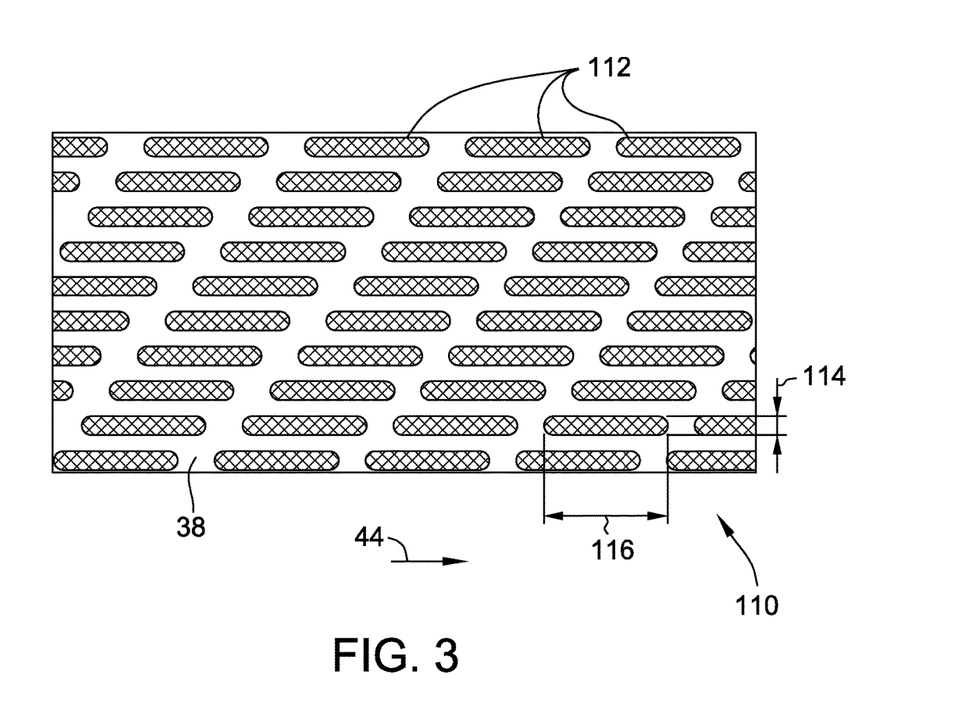
FIG. 3 is a schematic illustration of a portion of an embodiment of an acoustic liner facesheet that may be used with the inner barrel shown in FIG. 2.

Moreover, acoustic liner facesheet 110 includes a plurality of orifices 112 extending therethrough in a generally radial direction. FIG. 3 is a schematic illustration of a portion of an embodiment of acoustic liner facesheet 110, viewed in a radial direction from centerline 12 (shown in FIG. 1). With reference to FIG. 2 and FIG. 3, in the illustrated embodiment, orifices 112 are elongated in axial direction 44, that is, orifices 112 are slots aligned in the direction of airflow 42. In certain embodiments, orifices 112 have a width 114 in a range of about 0.050 to about 0.300 inches, and a length 116 in a range of about 0.250 to about 1.500 inches. In an embodiment, orifices 112 have a width 114 of about 0.100 inches and a length 116 of about 0.730 inches. In alternative embodiments, orifices 112 have any width 114 and length 116 that enables acoustic liner facesheet 110 to function as described herein. Moreover, in the illustrated embodiment, orifices 112 are disposed in a staggered pattern such that they alternate in axial position along a circumference of acoustic liner facesheet 110. In alternative embodiments, orifices 112 may be disposed in any suitable pattern that enables acoustic liner facesheet 110 to function as described herein. Furthermore, in still other alternative embodiments, orifices 112 have any other suitable shape, such as but not limited to circular, that enables acoustic liner facesheet 110 to function as described herein.

In certain embodiments, orifices 112 are arranged on acoustic liner facesheet 110 such that acoustic liner facesheet 110 has a porosity in a range of about 15 to about 30 percent open area. In an embodiment, orifices 112 are arranged such that acoustic liner facesheet 110 has a porosity of about 25 percent open area. In at least some embodiments, a shape and spacing of orifices 112 on acoustic liner facesheet 110 facilitate an increased linearity of, and acoustic attenuation by, acoustic liner 100, as compared to at least some known perforated facesheets. Additionally, alignment of orifices 112 in the direction of airflow 42 facilitates minimizing excrescence drag created by orifices 112. Moreover, a shape and spacing of orifices 112 facilitates an increased structural integrity of acoustic liner facesheet 110 for a given porosity. A shape and spacing of orifices 112 also facilitates a decreased cost and time required to manufacture acoustic liner facesheet 110. For example, in a particular embodiment, acoustic liner facesheet 110 is used as part of nacelle 10 (shown in FIG. 1) for a turbofan engine, and acoustic liner facesheet 110 includes about 96,000 orifices 112, wherein millions of perforations are required for a conventional acoustic liner facesheet in a similar application.

With reference again to FIG. 2, in the illustrated embodiment, acoustic liner 100 also includes a first fabric sheet 130 disposed generally concentrically about acoustic liner facesheet 110. First fabric sheet 130 is coupled to acoustic liner facesheet 110 in a substantially face-to-face relationship, such that first fabric sheet 130 is acoustically coupled to orifices 112. First fabric sheet 130 is formed at least partially from a material that provides substantially linear acoustic attenuation. In certain embodiments, first fabric sheet 130 is formed from a woven fabric, such as a fabric woven from thermoplastic fibers in the polyaryletherketone (PAEK) family. In an embodiment, first fabric sheet 130 is formed from at least one of a polyetherketoneketone (PEKK) and a polyether ether ketone (PEEK) woven fabric. Additionally, in certain embodiments, first fabric sheet 130 has a thickness in a range of about 0.003 to about 0.100 inches. In an embodiment, first fabric sheet 130 has a thickness of about 0.005 inches. In alternative embodiments, first fabric sheet 130 is formed from any suitable material and has any suitable thickness that enables first fabric sheet 130 to function as described herein.

In the illustrated embodiment, first fabric sheet 130 is coupled to acoustic liner facesheet 110 using an adhesive 132. In certain embodiments, adhesive 132 is a reticulated film adhesive to facilitate avoiding interference with the acoustic coupling of orifices 112 and first fabric sheet 130. In alternative embodiments, first fabric sheet 130 is coupled to acoustic liner facesheet 110 in any suitable fashion that enables acoustic liner 100 to function as described herein.

Figure 4:
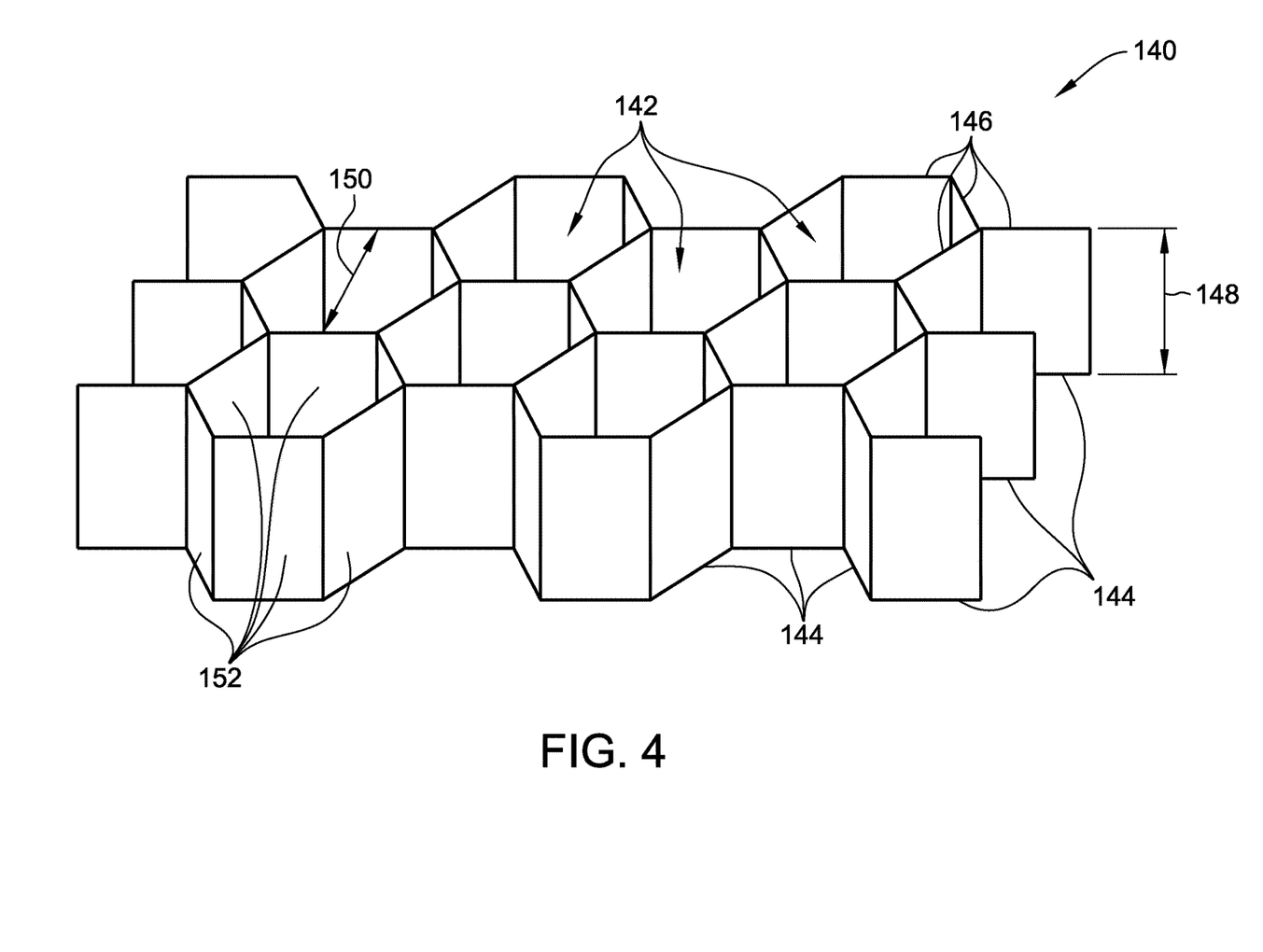
FIG. 4 is a perspective view of a portion of an embodiment of a first core that may be used with the inner barrel shown in FIG. 2.

Acoustic liner 100 further includes a first core 140 disposed generally concentrically about first fabric sheet 130. First core 140 includes a plurality of first core cells 142. FIG. 4 is a perspective view of a portion of one embodiment of first core 140 with the plurality of cells 142 arranged in a honeycomb pattern.

With reference to FIG. 2 and FIG. 4, the plurality of first core cells 142 is defined by a corresponding plurality of first core cell walls 152. Each cell wall 152 extends from a first edge 144, proximate to first fabric sheet 130, to a second edge 146. Cells 142 are acoustically coupled to first fabric sheet 130 and, thus, to orifices 112 of acoustic liner facesheet 110. A thickness 148 of first core 140 is defined between first edge 144 and second edge 146. In some embodiments, first core thickness 148 is chosen to facilitate damping of at least a portion of a particular acoustic frequency profile expected to be encountered by acoustic liner 100. In certain embodiments, thickness 148 is in a range of about 0.5 to about 4.0 inches. In alternative embodiments, thickness 148 is any suitable thickness that enables acoustic liner 100 to function as described herein.

In an embodiment, first core 140 is formed from fiberglass-reinforced phenolic resin. In alternative embodiments, first core 140 is formed from another fiber-reinforced resin. In still other alternative embodiments, first core 140 is formed from at least one of a plastic material, a metal, a coated paper material, or any other suitable material that enables first core 140 to function as described herein.

In the embodiment illustrated in FIG. 4, each cell 142 has a generally hexagonal cross-section. In an alternative embodiment, each cell has a FLEX CORE® cross-section. In another alternative embodiment, each cell has a DOUBLE-FLEX™ cross-section. FLEX CORE® and DOUBLE-FLEX™ are trademarks of Hexcel Corporation of Stamford, Conn. In still other embodiments, cells 142 have any suitable cross-section that enables acoustic liner 100 to function as described herein.

Moreover, each cell 142 has a characteristic cross-sectional diameter 150. For example, in the embodiment illustrated in FIG. 4, characteristic cross-sectional diameter 150 is defined between opposing cell walls 152 of the hexagon. For embodiments in which cells 142 have a cross-section that is other than hexagonal, characteristic cross-sectional diameter 150 may be similarly defined. In certain embodiments, each cell 142 has a cross-sectional characteristic diameter 150 in a range of about 0.1 to about 1.0 inch. In an embodiment, characteristic cross-sectional diameter 150 is about 0.375 inches. In alternative embodiments, characteristic cross-sectional diameter 150 is any suitable characteristic diameter that enables acoustic liner 100 to function as described herein.

With reference to FIG. 2, in the illustrated embodiment, first edge 144 of first core 140 is coupled to first fabric sheet 130 using an adhesive 158. In certain embodiments, adhesive 158 is a reticulated film adhesive to facilitate avoiding interference with the acoustic coupling of first fabric sheet 130 and cells 142. In alternative embodiments, first core 140 is coupled to first fabric sheet 130 in any suitable fashion that enables acoustic liner 100 to function as described herein.

Also in the illustrated embodiment, acoustic liner 100 includes a second fabric sheet 160 disposed generally concentrically about first core 140. Second fabric sheet 160 is formed at least partially from a material that provides substantially linear acoustic attenuation. Second fabric sheet 160 may be formed from any of the materials and may have any thickness in the range described above for first fabric sheet 130. In certain embodiments, first fabric sheet 130 and second fabric sheet 160 are formed from substantially identical materials and have substantially identical thicknesses. In other embodiments, first fabric sheet 130 and second fabric sheet 160 each are formed from a different material and/or each have a different thickness.

Second edge 146 of first core 140 is coupled to second fabric sheet 160 using an adhesive 162, such that second fabric sheet 160 are acoustically coupled to cells 142 and, thus, to orifices 112 of acoustic liner facesheet 110. In certain embodiments, adhesive 162 is a reticulated film adhesive to facilitate avoiding interference with the acoustic coupling of cells 142 and second fabric sheet 160. In alternative embodiments, first core 140 is coupled to second fabric sheet 160 in any suitable fashion that enables acoustic liner 100 to function as described herein.

Acoustic liner 100 further includes a second core 170 disposed generally concentrically about second fabric sheet 160. Second core 170 includes a plurality of second core cells 172. In an embodiment, second core cells 172 are arranged in a honeycomb pattern, similar to that shown in FIG. 4 for first core 140. The plurality of second core cells 172 is defined by a corresponding plurality of second core cell walls 182. Each cell wall 182 extends from a first edge 174, proximate to second fabric sheet 160, to a second edge 176.

Cells 172 are acoustically coupled to second fabric sheet 160 and, thus, to cells 142 of first core 140 and to orifices 112 of acoustic liner facesheet 110. A thickness 178 of second core 170 is defined between first edge 174 and second edge 176. Moreover, each cell 172 has a characteristic cross-sectional diameter 180 defined as described above for cells 142 of first core 140.

Second core 170 may be formed from any of the materials, and its cells 172 may have any cross-sectional shape and any characteristic cross-sectional diameter 180, as described above for first core 140. In certain embodiments, first core 140 and second core 170 are formed from substantially identical materials and their respective cells have substantially identical cross-sectional shapes and characteristic cross-sectional diameters 150 and 180. In other embodiments, first core 140 and second core 170 each are formed from a different material, and/or their cells each have a different cross-sectional shape and/or a different characteristic cross-sectional diameter.

In some embodiments, second core thickness 178 is chosen to facilitate damping of at least a portion of a particular acoustic frequency profile expected to be encountered by acoustic liner 100. In certain embodiments, thickness 178 is in a range of about 0.5 to about 10.0 inches. In alternative embodiments, thickness 178 is any suitable thickness that enables acoustic liner 100 to function as described herein.

Furthermore, in certain embodiments, second core thickness 178 is not equal to first core thickness 148. In particular, first core thickness 148 and second core thickness 178 are selected as unequal to facilitate broadening a damping spectrum of acoustic liner 100. More specifically, thickness 178 is chosen such that cells 172 facilitating damping over a different frequency range from cells 142. Thus, thicknesses 178 and 148 are configured such that second core 170 complements a damping provided by first core 140. In alternative embodiments, thickness 178 is substantially equal to thickness 148.

In the illustrated embodiment, second core cells 172 are generally not aligned with first core cells 142. In other words, each of the plurality of second core cell walls 182 generally is not coplanar with any of the plurality of first core cell walls 152. Instead, in certain embodiments, second core cell walls 182 are shifted relative to first core cell walls 152 along at least one of axial direction 44 and circumferentially. This facilitates an ease of making acoustic liner 100, because it renders unnecessary an alignment process that would be required to make each of the plurality of second core cell walls 182 substantially coplanar with a corresponding one of the plurality of first core cell walls 152. In other words, it renders unnecessary an alignment process that would be required to align each first core cell 142 with a corresponding second core cell 172 to approximate a full depth cell extending from first edge 144 of first core 140 to second edge 176 of second core 170.

Similarly, for embodiments in which second core cells 172 are not aligned with first core cells 142, it facilitates an ease of making acoustic liner 100 as compared to providing a plurality of full depth cells having a thickness equal to thickness 148 of first core 140 plus thickness 178 of second core 170, and inserting a septum in each of the plurality of full depth cells to divide each full depth cell into two acoustically coupled cells of varying thickness. It should be understood, however, that embodiments in which each of the plurality of second core cell walls 182 is substantially coplanar with a corresponding one of the plurality of first core cell walls 152 are within the scope of the disclosure.

In the illustrated embodiment, first edge 174 of second core 170 is coupled to second fabric sheet 160 using an adhesive 188. In certain embodiments, adhesive 188 is a reticulated film adhesive to facilitate avoiding interference with the acoustic coupling of second fabric sheet 160 and cells 172. In alternative embodiments, second core 170 is coupled to second fabric sheet 160 in any suitable fashion that enables acoustic liner 100 to function as described herein.

Acoustic liner 100 further includes an acoustic liner backskin 190 disposed generally concentrically about second core 170. Acoustic liner backskin 190 may be formed from any of the materials and may have any thickness in the range described above for acoustic liner facesheet 110. In certain embodiments, acoustic liner facesheet 110 and acoustic liner backskin 190 are formed from substantially identical materials and have substantially identical thicknesses. In other embodiments, acoustic liner facesheet 110 and acoustic liner backskin 190 each are formed from a different material and/or each have a different thickness. In the illustrated embodiment, acoustic liner backskin 190 includes no perforations or orifices extending radially therethrough. In alternative embodiments, acoustic liner backskin 190 includes perforations extending radially therethrough. In still other alternative embodiments, acoustic liner backskin 190 includes orifices extending radially therethrough, such as orifices 112 described above for acoustic liner facesheet 110.

In the illustrated embodiment, second edge 176 of second core 170 is coupled to acoustic liner backskin 190 using an adhesive 192, such that acoustic liner backskin 190 is acoustically coupled to cells 172 and, thus, to cells 142 and to orifices 112 of acoustic liner facesheet 110. In certain embodiments, adhesive 192 is a reticulated film adhesive to facilitate avoiding interference with the acoustic coupling of cells 172 and acoustic liner backskin 190. In alternative embodiments, second core 170 is coupled to acoustic liner backskin 190 in any suitable fashion that enables acoustic liner 100 to function as described herein.

Structural inner barrel 200 is disposed generally concentrically about acoustic liner 100. Structural inner barrel 200 includes as its radially innermost layer a structural inner barrel facesheet 210. Structural inner barrel facesheet 210 may be formed from any of the materials and may have any thickness in the range described above for acoustic liner facesheet 110. In certain embodiments, acoustic liner facesheet 110 and structural inner barrel facesheet 210 are formed from substantially identical materials and have substantially identical thicknesses. In other embodiments, acoustic liner facesheet 110 and structural inner barrel facesheet 210 each are formed from a different material and/or each have a different thickness. In addition, in certain embodiments, in contrast to acoustic liner facesheet 110, structural inner barrel facesheet 210 has no perforations extending therethrough and/or is substantially non-linear. However, it should be understood that embodiments in which structural inner barrel facesheet 210 includes perforations or orifices extending radially therethrough are within the scope of this disclosure.

Structural inner barrel 200 further includes a third core 220 disposed generally concentrically about structural inner barrel facesheet 210. Third core 220 includes a plurality of third core cells 222. In an embodiment, third core cells 222 are arranged in a honeycomb pattern, similar to that shown in FIG. 4 for first core 140. The plurality of third core cells 222 is defined by a corresponding plurality of third core cell walls 232. Each cell wall 232 extends from a first edge 224, proximate to structural inner barrel facesheet 210, to a second edge 226. A thickness 228 of third core 220 is defined between first edge 224 and second edge 226. Moreover, each cell 222 has a characteristic cross-sectional diameter 230 defined as described above for cells 142 of first core 140.

Third core 220 may be formed from any of the materials and its cells 222 may have any cross-sectional shape as described above for first core 140. In certain embodiments, first core 140 and third core 220 are formed from substantially identical materials and their respective cells have substantially identical cross-sectional shapes. In other embodiments, first core 140 and third core 220 each are formed from a different material and/or their respective cells each have a different cross-sectional shape.

In the illustrated embodiment, cells 222 are not substantially acoustically coupled to acoustic liner 100. Third core thickness 228 and characteristic cross-sectional diameter 230 may be chosen primarily to satisfy a structural load requirement for inner barrel 30, rather than to provide desired acoustic damping characteristics. In certain embodiments, thickness 228 is in a range of about 0.5 to about 4.0 inches, and characteristic cross-sectional diameter 230 is in a range of about 0.1 to about 1.0 inch. In an embodiment, characteristic cross-sectional diameter 230 is about 0.250 inches.

In alternative embodiments, cells 222 are acoustically coupled to acoustic liner 100, and third core thickness 228 is chosen at least partially to facilitate acoustic damping of at least a portion of a particular acoustic frequency profile expected to be encountered by acoustic liner 100, as well as to meet structural load requirements. For example, thickness 228 may be configured such that third core 220 complements the damping provided by first core 140 and second core 170, as described above for thicknesses 178 and 148. In still other alternative embodiments, thickness 228 is any suitable thickness and characteristic cross-sectional diameter 230 is any suitable characteristic diameter that enables structural inner barrel 200 to function as described herein.

In the illustrated embodiment, third core cells 222 are generally not aligned with either of first core cells 142 and second core cells 172. In other words, each of the plurality of third core cell walls 232 generally is not coplanar with any of the plurality of first core cell walls 152 and generally is not coplanar with any of the plurality of second core cell walls 182. Instead, in certain embodiments, third core cell walls 232 are shifted relative to first core cell walls 152 and second core cell walls 182 along at least one of axial direction 44 and circumferentially. This facilitates an ease of making inner barrel 30, as described above. It should be understood, however, that embodiments in which each of the plurality of third core cell walls 232 is substantially coplanar with at least one of a corresponding one of the plurality of first core cell walls 152 and the plurality of second core cell walls 182 are within the scope of the disclosure.

In the illustrated embodiment, first edge 224 of third core 220 is coupled to structural inner barrel facesheet 210 using an adhesive 238. In certain embodiments, adhesive 238 is a reticulated film adhesive. In alternative embodiments, third core 220 is coupled to structural inner barrel facesheet 210 in any suitable fashion that enables structural inner barrel 200 to function as described herein.

Structural inner barrel 200 additionally includes as its radially outermost layer an outer structural backskin 240 disposed generally concentrically about third core 220. Outer structural backskin 240 may be formed from any of the materials and may have any thickness in the range described above for acoustic liner facesheet 110. In certain embodiments, acoustic liner facesheet 110 and outer structural backskin 240 are formed from substantially identical materials and have substantially identical thicknesses. In other embodiments, acoustic liner facesheet 110 and outer structural backskin 240 each are formed from a different material and/or each have a different thickness. In addition, in certain embodiments, in contrast to acoustic liner facesheet 110, outer structural backskin 240 has no perforations extending therethrough and/or is substantially non-linear. However, it should be understood that embodiments in which outer structural backskin 240 includes perforations or orifices extending radially therethrough are within the scope of this disclosure.

In the illustrated embodiment, second edge 226 of third core 220 is coupled to outer structural backskin 240 using an adhesive 242. In certain embodiments, adhesive 242 is a reticulated film adhesive. In alternative embodiments, third core 220 is coupled to outer structural backskin 240 in any suitable fashion that enables structural inner barrel 200 to function as described herein.

With reference also to FIG. 1, in the illustrated embodiment, structural inner barrel 200 generally aft of aft bulkhead 70 does not include third core 220. Instead, structural inner barrel 200 generally aft of aft bulkhead 70 is a non-core laminate structure, with at least a portion of flange 270 integrally formed therein. As discussed above, an aft portion of flange 270 extends generally radially outward and facilitates coupling inner barrel 30 to, for example, a turbofan casing (not shown) of nacelle 10. In alternative embodiments, flange 270 is coupled to structural inner barrel 200 in any other suitable fashion, such as by fasteners. Similarly, in certain embodiments, a forward end of structural inner barrel 200 proximate to bracketed gussets 36 does not include third core 220, but is a non-core laminate structure. In alternative embodiments, third core 220 extends generally aft of aft bulkhead 70 and/or generally to the forward end of structural inner barrel 200 proximate to bracketed gussets 36.

Further in the embodiment illustrated in FIG. 2, acoustic liner 100 is coupled to structural inner barrel 200 to form inner barrel 30 using an adhesive 250. In an embodiment, adhesive 250 is a non-reticulated film adhesive. In alternative embodiments, however, adhesive 250 may be a reticulated adhesive. Moreover, in certain embodiments, acoustic liner 100 and structural inner barrel 200 are each assembled and cured separately before acoustic liner 100 is coupled to structural inner barrel 200 using adhesive 250. In alternative embodiments, acoustic liner 100, adhesive 250, and structural inner barrel 200 are assembled and cured together to form inner barrel 30. In still other alternative embodiments, acoustic liner 100 is coupled to structural inner barrel 200 to form inner barrel 30 in any suitable fashion that enables inner barrel 30 to function as described herein.

Because structural inner barrel 200 satisfies a structural load requirement for inner barrel 30, it should be understood that any suitable acoustic damping device may be coupled to structural inner barrel 200 in addition to, or as an alternative to, acoustic liner 100 to achieve a desired acoustic damping characteristic for nacelle 10. For example, in an alternative embodiment, at least one bulk acoustic absorber (not shown), rather than acoustic liner 100, is coupled radially inward of structural inner barrel 200. A use of structural inner barrel 200 thus decouples a structural aspect and an acoustic aspect of a design of nacelle 10, facilitating a use of a wide range of acoustic damping devices within nacelle 10.

Figure 5:
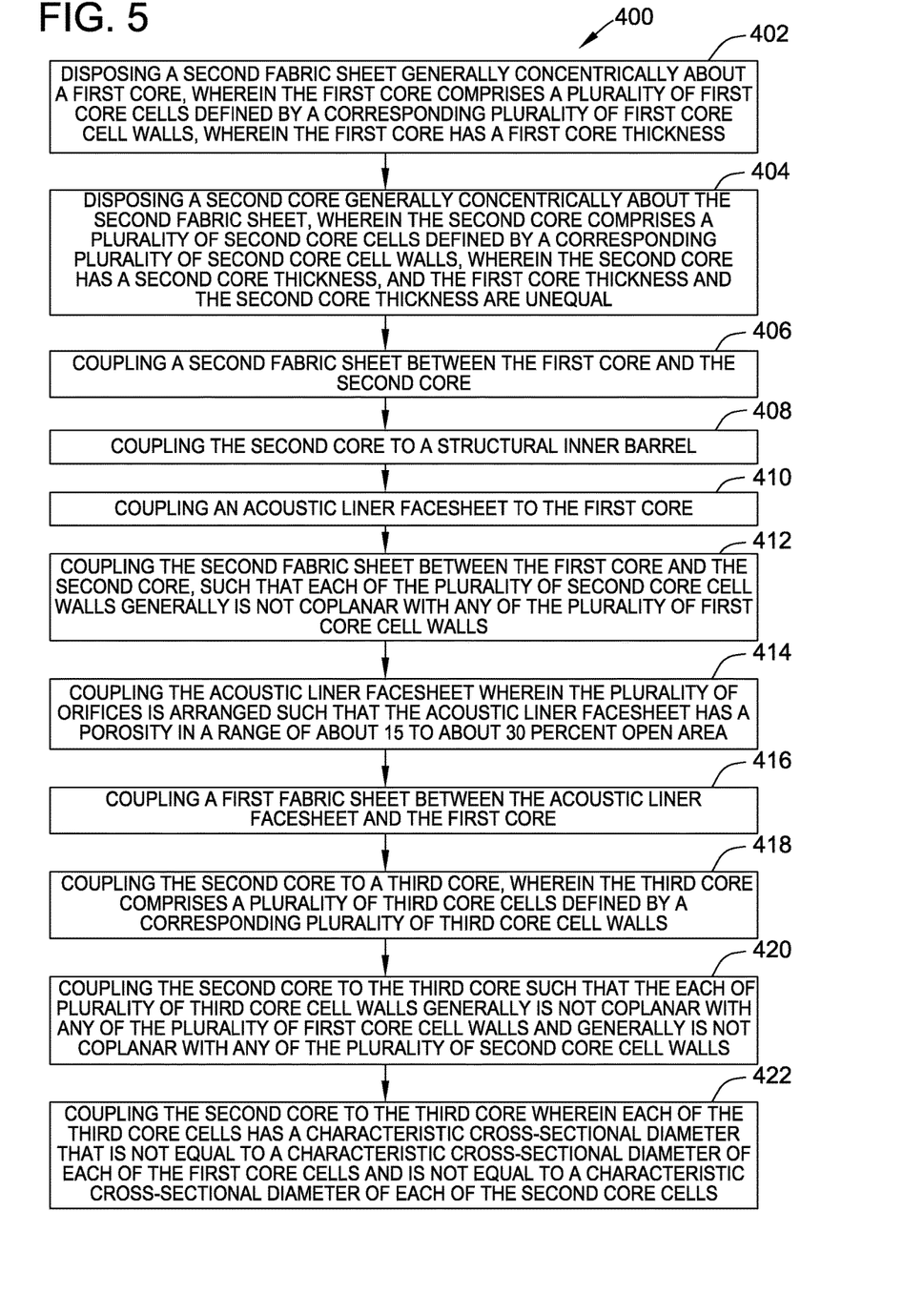
FIG. 5 is a flowchart of an embodiment of a method of making an engine nacelle, such as the engine nacelle shown in FIG. 1.

FIG. 5 is a flowchart of an embodiment of a method 400 of making an engine nacelle, such as nacelle 10. Method 400 includes disposing 402 a second fabric sheet, such as second fabric sheet 160, generally concentrically about a first core, such as first core 140, comprising a plurality of first core cells, such as first core cells 142, defined by a corresponding plurality of first core cell walls, such as first core cell walls 152. The first core has a first core thickness, such as thickness 148. Method 400 also includes disposing 404 a second core, such as second core 170, generally concentrically about the second fabric sheet. The second core comprises a plurality of second core cells, such as second core cells 172, defined by a corresponding plurality of second core cell walls, such as second core cell walls 182. The second core has a second core thickness, such as thickness 178. Method 400 further includes coupling 406 the second fabric sheet between the first core and the second core, and coupling 408 the second core to a structural inner barrel, such as structural inner barrel 200.

In certain embodiments, method 400 further includes coupling 410 an acoustic liner facesheet, such as acoustic liner facesheet 110, to the first core. The acoustic liner facesheet includes a plurality of orifices, such as orifices 112, each extending through the acoustic liner facesheet. Coupling 406 the second fabric sheet between the first core and the second core may include coupling 412 the second fabric sheet such that each of the plurality of second core cell walls generally is not coplanar with any of the plurality of first core cell walls. Coupling 410 the acoustic liner facesheet may include coupling 414 the acoustic liner facesheet wherein the plurality of orifices is arranged such that the acoustic liner facesheet has a porosity in a range of about 15 to about 30 percent open area.

In certain embodiments, method 400 additionally includes coupling 416 a first fabric sheet, such as first fabric sheet 130, between the acoustic liner facesheet and the first core. Coupling 408 the second core to the structural inner barrel may include coupling 418 the second core to a third core, such as third core 220, comprising a plurality of third core cells, such as third core cells 222, defined by a corresponding plurality of third core cell walls, such as third core cell walls 232. Coupling 418 the second core to the third core may include coupling 420 the second core to the third core such that the each of plurality of third core cell walls generally is not coplanar with any of the plurality of first core cell walls and generally is not coplanar with any of the plurality of second core cell walls. Coupling 418 the second core to the third core also may include coupling 422 the second core to the third core wherein each of the third core cells has a characteristic cross-sectional diameter, such as characteristic cross-sectional diameter 230, that is not equal to a characteristic cross-sectional diameter of each of the first core cells, such as characteristic cross-sectional diameter 150, and is not equal to a characteristic cross-sectional diameter of each of the second core cells, such as characteristic cross-sectional diameter 180.

Each of the processes of method 400 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide an apparatus and method for noise attenuation in an engine nacelle. The embodiments provide a plurality of generally concentric cores in which a thickness of a first of the plurality of cores is not equal to a thickness of a second of the plurality of cores, such that a damping provided by the second core complements a damping provided by first core. Because the first and second cores are not relied upon to meet structural strength requirements of the nacelle, the cells in the first core generally are not aligned with the cells in a second core, but can be aligned in certain embodiments. In addition, the embodiments provide a linear facesheet for the plurality of cores with orifices elongated in a direction of airflow.

The embodiments described herein provide improvements over at least some known noise attenuation systems for engine nacelles. As compared to at least some known noise attenuation systems, the embodiments described herein facilitate an ease of manufacture of the nacelle by avoiding a time- and cost-intensive cell alignment and/or cell-by-cell septumization process. In addition, the embodiments described herein facilitate an increased percent open area of the facesheet, and thus an increased linearity, while maintaining structural integrity of the facesheet and reducing excrescence drag.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inner barrel for a nacelle for an engine, the inner barrel comprising:
   a radially inner acoustic liner; and
   a radially outer structural barrel, comprising:
      a structural core comprising a plurality of core cells defined by a corresponding plurality of core cell walls; and
      a flange for coupling the inner barrel to the nacelle, wherein at least a portion of the flange is formed integrally with the structural barrel.

2. An inner barrel according to claim 1, wherein the structural core of the structural barrel is a third structural core, wherein the plurality of core cells defined by the corresponding plurality of core cell walls is a plurality of third core cells defined by a corresponding plurality of third core cell walls, and wherein the acoustic liner comprises:
   a first core comprising a plurality of first core cells defined by a corresponding plurality of first core cell walls;
   a second core comprising a plurality of second core cells defined by a corresponding plurality of second core cell walls;
   a fabric sheet coupled between said first core and said second core.

3. An inner barrel according to claim 2, wherein the first core has a first core thickness, and the second core has a second core thickness, wherein the first and second core thicknesses are unequal.

4. An inner barrel according to claim 2, wherein each of the plurality of second core cell walls generally is not coplanar with any of the plurality of first core cell walls.

5. An inner barrel according to claim 2, wherein the acoustic liner further comprises an acoustic liner facesheet coupled to the first core, said acoustic liner facesheet including a plurality of orifices each extending therethrough.

6. An inner barrel according to claim 5, wherein the acoustic liner further comprises a first fabric sheet coupled between said acoustic liner facesheet and said first core.

7. An inner barrel according to claim 2, wherein each of the plurality of third core cell walls generally is not coplanar with any of the plurality of first core cell walls and generally is not coplanar with any of the plurality of second core cell walls.

8. An inner barrel according to claim 2, wherein the fabric sheet is coupled with adhesive between said first core and said second core.

9. An inner barrel according to claim 6, wherein the first fabric sheet is coupled with adhesive between said acoustic liner facesheet and said first core.

10. A nacelle for an engine, the nacelle comprising:
    a turbofan casing; and
    the inner barrel of claim 1, wherein the flange of the structural barrel is coupled to the turbofan casing.

11. A method of making a nacelle, the method comprising:
    disposing a fabric sheet generally concentrically around a first core, wherein the first core comprises a plurality of first core cells defined by a corresponding plurality of first core cell walls, the first core having a first core thickness;
    disposing a second core generally concentrically about the fabric sheet, wherein the second core comprises a plurality of second core cells defined by a corresponding plurality of second core cell walls, the second core having a second core thickness;
    coupling the fabric sheet between the first core and the second core;
    coupling the second core to a radially outer structural barrel, the structural barrel including (i) a plurality of third core cells defined by a corresponding plurality of third core cell walls and (ii) a flange, wherein at least a portion of the flange is formed integrally with the structural barrel; and
    coupling the flange of the structural barrel to a turbofan casing.

12. The method according to claim 11, further comprising coupling an acoustic liner facesheet to the first core, wherein the acoustic liner facesheet includes a plurality of orifices each extending through the acoustic liner facesheet.

13. The method according to claim 11, wherein coupling the second fabric sheet between the first core and the second core comprises coupling the second fabric sheet between the first core and the second core such that each of the plurality of second core cell walls generally is not coplanar with any of the plurality of first core cell walls.

14. The method according to claim 12, wherein the plurality of orifices is arranged such that the acoustic liner facesheet has a porosity in a range of about 15 to about 30 percent open area.

15. The method according to claim 14, further comprising coupling a first fabric sheet between the acoustic liner facesheet and the first core.

16. The method according to claim 11, wherein coupling the second core to the structural barrel comprises coupling the second core to the third core such that each of the plurality of third core cell walls generally is not coplanar with any of the plurality of first core cell walls and generally is not coplanar with any of the plurality of second core cell walls.

17. The method according to claim 11, wherein each of the third core cells has a characteristic cross-sectional diameter that is not equal to a characteristic cross-sectional diameter of each of the first core cells and is not equal to a characteristic cross-sectional diameter of each of the second core cells.

18. The method according to claim 11, wherein coupling the fabric sheet between the first core and the second core comprises coupling using an adhesive.

19. The method according to claim 15, wherein coupling a first fabric sheet between the acoustic liner facesheet and the first core comprises coupling using an adhesive.

* * * * *